United States Patent
Murota et al.

(10) Patent No.: US 7,331,741 B2
(45) Date of Patent: Feb. 19, 2008

(54) NUMERICALLY CONTROLLED MACHINE TOOL

(75) Inventors: Masahiro Murota, Yamanashi (JP);
Akihiko Fujimoto, Yamanashi (JP);
Norio Watanabe, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 487 days.

(21) Appl. No.: 11/114,191

(22) Filed: Apr. 26, 2005

(65) Prior Publication Data

US 2005/0238447 A1    Oct. 27, 2005

(30) Foreign Application Priority Data

Apr. 26, 2004   (JP) .............................. 2004-130386

(51) Int. Cl.
*B23C 1/00* (2006.01)
(52) U.S. Cl. ...................... 409/194; 409/208; 409/134; 409/80
(58) Field of Classification Search ............ 409/79–80, 409/186–187, 193–194, 207, 208, 232, 134; 408/3, 8, 9, 11, 239 R; 700/174–175, 177
See application file for complete search history.

(56) References Cited

U.S. PATENT DOCUMENTS

| 5,224,272 | A | 7/1993 | Toraason et al. | |
| 6,752,031 | B2 | 6/2004 | Akamatsu et al. | |
| 7,037,053 | B2 * | 5/2006 | Matsumoto et al. | 409/234 |
| 7,037,248 | B2 * | 5/2006 | Takaku | 483/11 |
| 7,175,374 | B2 * | 2/2007 | Takaku | 409/194 |
| 7,217,071 | B2 * | 5/2007 | Bayha et al. | 409/131 |
| 2001/0049974 | A1 | 12/2001 | Akamatsu | |
| 2004/0029690 | A1 | 2/2004 | Takaku | |

FOREIGN PATENT DOCUMENTS

| EP | 1 162 030 | 12/2001 |
| JP | 2001-347440 | 12/2001 |
| JP | 2002-200542 | 7/2002 |
| JP | 2002200542 | 7/2002 |
| JP | 2003-334742 | 11/2003 |
| JP | 2003334742 | 11/2003 |
| WO | WO-02/34464 A1 * | 5/2002 |

OTHER PUBLICATIONS

EP Search Report for corresponding application EP 05 25 2575.5-2302 dated Sep. 8, 2005.

* cited by examiner

*Primary Examiner*—Erica Cadugan
(74) *Attorney, Agent, or Firm*—Staas & Halsey LLP

(57) ABSTRACT

A numerically controlled machine tool performs machining by rotating a rotational tool attached to a tool holder mounted on a spindle, with keys fitted into key grooves in the tool holder. The numerically controlled machine tool includes predetermined-amount rotating unit for stopping the tool holder at a predetermined rotational position and then rotating the tool holder by a given amount, and a distance sensor which is installed apart from the tool holder and measures a distance to the outer surface of the tool holder. The predetermined-amount rotating unit stops the tool holder at a rotational position at which the key grooves do not face the distance sensor, then rotates the tool holder by the given amount. The distance sensor measures the distance to the tool holder while the tool holder is rotating. The measurement result is compared with a reference distance or distances to discriminate between normal and abnormal rotational run-out of the tool holder.

8 Claims, 14 Drawing Sheets

NUMERICALLY CONTROLLED MACHINE TOOL

BACKGROUND OF THE INVENTION

1. Field of the Invention

The present invention relates to a control function for preventing dimensional error in machining by numerically controlled machine tools equipped with an automatic tool exchanger and, more particularly, to measurement of run-out of the outer surface of a tool holder in order to determine whether the tool has been properly mounted on the spindle of a numerically controlled machine tool.

2. Description of the Prior Art

In machine tools, high machining accuracy, low machining failure rates, and non-delivery of poorly machined products are demanded. For machine tools equipped with an automatic tool exchanger, there is a particularly strong need for detecting chips caught between the tool holder and the spindle during operation of the automatic tool exchanger, to prevent the machining defects that such chips can cause.

Chips caught between a tool holder and a spindle cause a tool holder run-out, resulting in inaccurately machined dimensions. Techniques for determining run-out due to chips are disclosed in, for example, the following references.

Japanese Patent Application Laid-open No. 2002-200542 discloses a machine tool which measures run-out of a flange section of a tool holder including key grooves by using a displacement detector while rotating the spindle, performs a Fourier analysis of measured data, and calculates the eccentricity of the tool holder from the amplitude of the fundamental frequency component.

Japanese Patent Application Laid-open No. 2003-334742 discloses a displacement detector which measures run-out of a flange section of a tool holder. This displacement detector is made movable in forward and backward directions so that the sensitivity of the displacement detector is corrected.

Japanese Patent Application Laid-open No. 2001-347440 discloses a machine tool which rotates a spindle to which a test tool is attached, detects the displacement of the outer surface of the test tool by using a displacement detector, and compares the detected displacement with a tolerance in order to diagnose the run-out accuracy of the spindle.

To transmit the rotation of a spindle to a tool, a tool holder usually has a key groove on its cylindrical outer surface to accept a key on the spindle. In the machine tools disclosed in the prior art, which use a displacement detector to measure the distance to the outer cylindrical surface of a tool holder, the displacement detector measures a portion of the key groove in the state where the displacement detector is located away from the key groove. Therefore, an accurate measurement cannot be made just by turning the spindle, because it cannot be determined whether measured variations are attributable to poor tool attachment due to chips or other foreign objects caught between the tool holder and spindle, or due to the portion of the key groove.

SUMMARY OF THE INVENTION

According to the present invention, a magnetic sensor built into a spindle motor is used to control the position of the spindle while run-out of the outer cylindrical surface of a tool holder is measured, so that the effect of the key grooves can be removed from the measurement, chips caught between the spindle and tool holder can be detected reliably, and whether the tool is attached correctly relative to the spindle of the machine tool can be determined. This is achieved in the present invention with a minimal hardware configuration that simply adds a non-contact distance sensor to an ordinary machine tool.

To maintain workpiece machining accuracy, the numerically controlled machine tool of the present invention rotates the spindle of the machine tool with the tool holder attached and measures the run-out of the outer cylindrical surface of the tool holder to check whether the tool holder is properly mounted on the spindle. Key grooves are usually provided on the outer cylindrical surfaces of tool holders to transmit rotation. Although the key grooves are an obstacle to accurate run-out measurement, the numerically controlled machine tool of the present invention prevents the key grooves from affecting the measurement by performing spindle position control to exclude the key grooves from the significant measured data, enabling the run-out of the outer surface of the tool holder to be measured accurately with a simple measurement setup.

The numerically controlled machine tool of the present invention mounts a tool holder on a spindle by fitting keys into key grooves on the tool holder, and operates by turning a rotational tool attached to the tool holder. The numerically controlled machine comprises predetermined-amount rotating means for stopping the tool holder at a certain rotational position and then rotating the tool holder by a given amount, and a distance sensor disposed at a distance from the tool holder for measuring the distance to the outer surface of the tool holder. The predetermined-amount rotating means stops the tool holder at a rotational position at which the key grooves do not face the distance sensor, and then rotates the tool holder by the given amount. The distance sensor measures the distance to the tool holder while the tool holder is rotating. The measured distance is compared with a reference distance to determine whether run-out of the tool holder is normal or abnormal.

The predetermined-amount rotating means may have a structure which includes a spindle motor and an angular position sensor that detects the angular position of the spindle motor, eliminating the need for adding a mechanism for rotating the rotational tool by a predetermined amount to the mechanism provided in an ordinary numerical controller.

In a first example of determination as to whether a rotational run-out is normal or abnormal, the measured distances are compared with a reference value to monitor run-out toward the tool holder, as viewed from the distance sensor, (or run-out in a negative direction). Rotational run-out of the tool holder is decided as abnormal when the measured distance is smaller than the reference value. In this example, an abnormal run-out in which a part of the outer surface of the tool holder deviates to approach the distance sensor is detected.

In a second example of determination as to whether a rotational run-out is normal or abnormal, the measured distances are compared with upper and lower limits to monitor run-out toward the tool holder (or run-out in a negative direction) and also run-out away from the tool holder (or run-out in a positive direction), as viewed from the distance sensor. Rotational run-out of the tool holder is decided as abnormal when the measured distance is outside the range defined by the upper and lower limits. In this example, an abnormal run-out in which a part of the outer surface of the tool holder deviates to approach or recede from the distance sensor is detected.

In a third example of determination as to whether a rotational run-out is normal or abnormal, an allowable amplitude range is set in advance, and the range of variation of the outer surface of a tool holder is monitored. When the range of variation is not within the allowable amplitude range, rotational run-out of the tool holder is decided as abnormal. In this example, an abnormal run-out in which the outer surface of the tool holder deviates over too wide a range is detected.

In each of the examples, predetermined-amount rotating means carries out distance measurement several times by changing a preset rotation stop position which is also a measurement start position. Also, distance measurement is carried out for a position outside key grooves. Further, calibration is performed such that measurement value of the distance sensor is set zero in the preset rotation stop position which is also a measurement start position.

In the first example, zero setting is made at a plurality of positions excluding a key groove on the outer cylindrical surface of the tool holder, and run-out in a negative direction is measured repeatedly. Accordingly, accurate run-out measurement of the outer cylindrical surface of the tool holder is obtained.

In the second example, an operation necessary for measurement is performed with one time zero setting and a spindle rotation of half a turn or less, between the key grooves. Accordingly, the measurement can be completed in short time.

In the third example, run-out in both the positive and negative directions is measured on the outer cylindrical surface of the tool holder within the range excluding the key grooves, so the measurement can be completed with only one zero setting and one turn of the spindle.

According to the present invention, run-out of the outer surface of the tool holder can be measured accurately without being affected by the key grooves, thereby enabling detection of chips interfering with the engagement between the spindle and tool holder.

BRIEF DESCRIPTION OF THE DRAWINGS

The purposes and advantages of the present invention, including those described above, will be clarified with reference to the attached drawings in combination with the description of the embodiment presented below. Of these drawings.

DETAILED DESCRIPTION OF THE PREFERRED EMBODIMENTS

Figure 1:
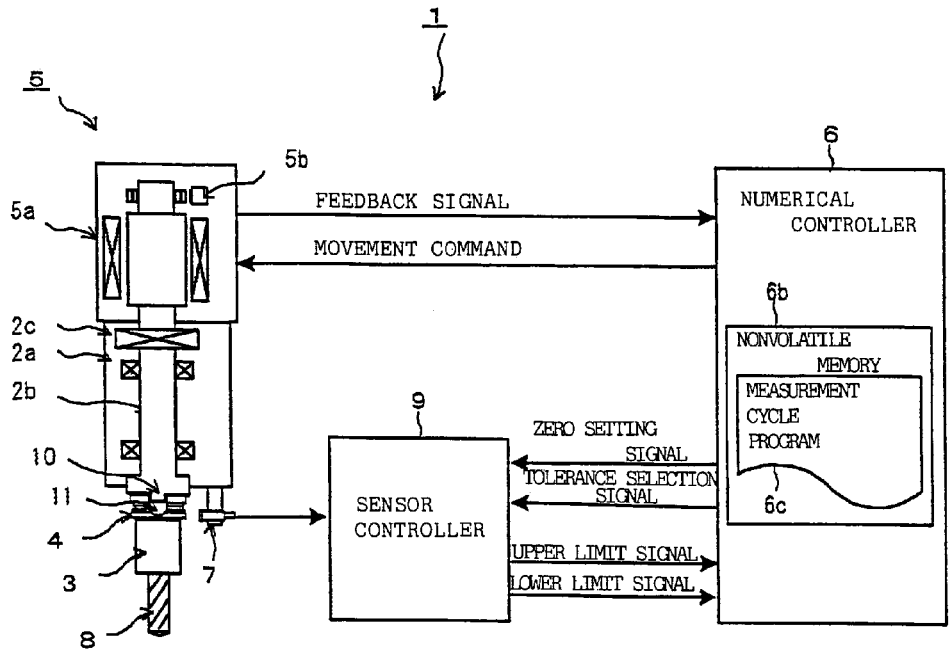
FIG. 1 schematically illustrates the structure of a numerically controlled machine tool according to the present invention.

FIG. 1 schematically illustrates the structure of a numerically controlled machine tool according to the present invention. The numerically controlled machine tool 1 in FIG. 1 comprises a spindle section 2 for rotationally driving a tool 8 and a driving section 5. The driving section 5 is controlled by a numerical controller 6. The numerical controller 6 carries out drive control according to a decision signal from a sensor controller 9 indicating abnormal run-out of the tool holder 3.

The driving section 5 comprises a spindle motor 5a and a sensor 5b for detecting the rotational state of the spindle motor 5a. The sensor 5b, which may be a magnetic sensor, for example, detects the rotational angle and rotational velocity of the spindle motor 5a.

The spindle section 2 has a spindle housing 2a, a spindle 2b turned by the spindle motor 5a in the spindle housing 2a, and a coupling 2c for interconnecting the spindle 2b and the spindle motor 5a. The tool holder 3 is mounted on the end of the spindle 2b by fitting keys 10 which the spindle 2b has into key grooves 11 formed in the tool holder 3.

A sensor head 7 is attached to the spindle section 2 in such a way that the sensor head 7 faces the outer cylindrical surface 4 of the tool holder 3, so that the sensor head measures the distance to the outer cylindrical surface 4 of the tool holder 3. The distance data obtained by the sensor head 7 is sent to the sensor controller 9, where run-out of the outer cylindrical surface of the tool holder 3 is measured according to the distance and determined as to whether there are chips or other foreign objects caught between the tool holder 3 and the spindle 2b.

The sensor controller 9 can detect an abnormal run-out by various examples. These examples can be implemented by a zero setting signal and a tolerance selection signal sent from the numerical controller 6.

Figure 2A:
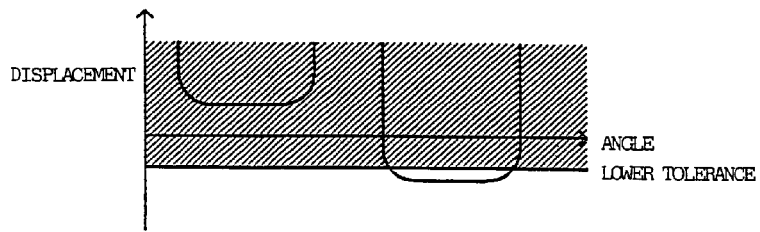
FIGS. 2A to 2C illustrate first, second, and third examples for the detection of abnormal rotational run-out of the tool holder by the numerically controlled machine tool in FIG. 1.
Figure 2B:
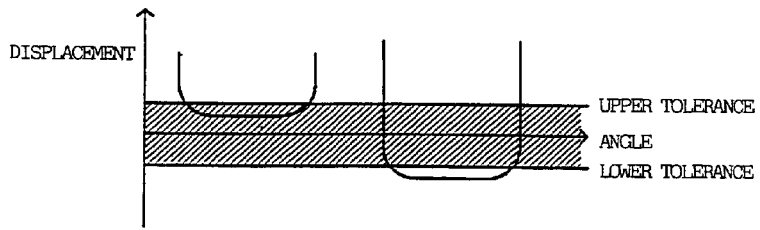
Figure 2C:
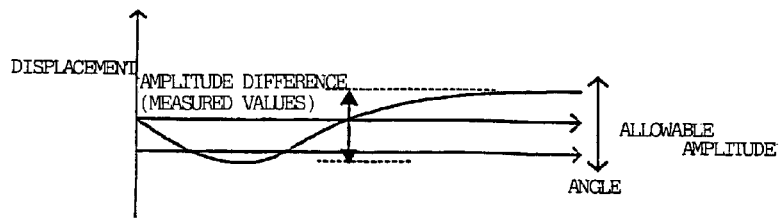

The present invention provides three examples shown in FIGS. 2A to 2C for detecting abnormal run-out of the tool holder 3 in the numerically controlled machine tool. FIGS. 2A to 2C show displacements detected by the distance sensor (the sensor head) at different rotational angles of the tool holder 3.

FIG. 2A schematically illustrates a first example for discriminating between normal and abnormal rotational run-out. According to this first example for discrimination, measured distance ("displacement" indicated in FIG. 2A) is compared with a reference value. When the measured distance is less than the reference value, run-out of the tool holder is decided as abnormal. In the displacement (measured distance) shown in FIG. 2A, a run-out approaching the tool holder, as viewed from the distance sensor, is represented as a run-out in a negative direction, wherein a lower tolerance is set as the reference value. A run-out receding from the tool holder, as viewed from the distance sensor, is represented as a run-out in a positive direction, wherein an upper tolerance is set to a value considerably larger than the maximum distance that the distance sensor can measure as run-out in a positive direction.

In FIG. 2A, run-out of the tool holder is decided as normal when the measured distance is on the positive side with respect to the lower tolerance limit (or in the shaded area in FIG. 2A) On the other hand, run-out of the tool holder is decided as abnormal when the measured distance is on the negative side with respect to the lower tolerance. According to this example, an abnormal state in which a part of the outer cylindrical surface of the tool holder deviates toward the distance sensor is detected.

FIG. 2B schematically illustrates a second example for discriminating between normal and abnormal rotational run-out. According to this second example for discrimination, measured distances ("displacement" indicated in FIG. 2B) are compared with an upper tolerance limit and a lower tolerance limit. Both run-out approaching the tool holder (run-out in a negative direction), as viewed from the distance sensor, and run-out receding from the tool holder (run-out in a positive direction), as viewed from the distance sensor, are monitored. Run-out of the tool holder is decided as normal when the measured distance is outside the range defined by the upper and lower tolerance limits.

In FIG. 2B, run-out of the tool holder is decided as normal when a measured distance is in the area bracketed by the upper and lower tolerances (or in the shaded area in the figure). On the other hand, run-out of the tool holder is decided as abnormal when a measured run-out is on the positive side with respect to the upper tolerance limit or on the negative side with respect to the lower tolerance limit. According to this example, an abnormal state in which a part of the outer cylindrical surface of the tool holder deviates either toward or away from the distance sensor is detected.

FIG. 2C schematically illustrates a third example for discriminating between normal and abnormal rotational run-out. According to this example, an allowable amplitude is set as a reference value, and the range of variation of the distance to the outer cylindrical surface of the tool holder is monitored. Run-out of the tool holder is decided as abnormal when the range of variation exceeds the allowable amplitude. The range of variation of the measured distances is represented by the difference between the maximum measured positive displacement and the maximum measured negative displacement. According to this example, an abnormal state in which the outer cylindrical surface of the tool holder exhibits too great a range of deviation is detected.

In FIGS. 2A to 2C, the measured distances to the key grooves show large positive displacements, so that the distances (displacements) measured within the angular ranges corresponding to the key grooves do not provide significant measured data for detecting rotational run-out.

The angular ranges corresponding to the key grooves and the remaining angular ranges excluding the key grooves, from which measured data significant for detection of rotational run-out is obtained, can be known from the positions of the key grooves on the tool holder, the position in which the tool holder is mounted on the spindle, and other data. To measure the run-out of the outer cylindrical surface of the tool holder accurately, the numerically controlled machine tool according to the present invention obtains measured data only from the angular ranges within which measured data significant for rotational run-out detection is obtained, excluding the angular ranges corresponding to the key grooves, by controlling the rotation of the spindle that rotationally drives the tool holder.

In FIG. 1, the sensor head 7 for detecting the distance to the outer cylindrical surface of the tool holder 3 is secured on the spindle housing 2a in such a way that the sensor head can measure the distance to the outer cylindrical surface 4 of the tool holder 3.

The spindle 2b and spindle motor 5a are joined together by the coupling means 2c at a predetermined speed ratio of, for example, 1 to 1. Positions in the rotational direction of the spindle 2b are detected by the magnetic sensor 5b mounted on the spindle motor 5a. The spindle 2b can rotationally move to any angle and stop according to a command from a measurement cycle program 6b stored in a nonvolatile memory 6a in the numerical controller 6.

The measurement cycle program 6b includes processes for sending a zero setting signal, sending a tolerance selection signal, giving a spindle stop angle command, starting measurement, and terminating measurement.

The numerical controller 6 sends the zero setting signal and tolerance selection signal to the sensor controller 9 according to the measurement cycle program 6b. Upon reception of a zero setting signal from the numerical controller 6, the sensor controller 9 resets the measured distance in the measured data to 0.

The sensor controller 9 stores a plurality of combinations of measurement mode and tolerance in advance. Upon reception of a tolerance selection signal from the numerical controller 6, the sensor controller 9 switches over to the corresponding combination of measurement mode and tolerance. Tolerance selection signals, measurement modes, and tolerances may be associated with one another as shown, for example, in Table 1.

TABLE 1

| Tolerance selection signal | Measurement mode | Tolerance |
|---|---|---|
| 1 | Normal mode | −5 μm to +∞ |
| 2 | Normal mode | −20 μm to +∞ |
| 3 | Normal mode | −5 μm to +5 μm |
| 4 | Normal mode | −20 μm to +20 μm |
| 5 | Amplitude mode | 5 μm |
| 6 | Amplitude mode | 20 μm |
| . | . | . |
| . | . | . |
| . | . | . |

"Normal mode" in the above table corresponds to the first and second examples (shown in FIGS. 2A and 2B) described above. "Amplitude mode" in the above table corresponds to the third example shown in FIG. 2C). The "normal mode" specified by tolerance selection signal 1 or 2 corresponds to the first example, in which the upper tolerance is set to +∞. The "normal mode" specified by tolerance selection signal 3 or 4 corresponds to the second example, in which upper and lower tolerances are set. The symbol +∞ represents a value considerably larger than the maximum positive displacement measurable by the distance sensor.

In the "normal mode" specified by tolerance selection signal 3 or 4 in Table 1, if the measured distance to the outer cylindrical surface 4 of the tool holder 3 is greater than the positive tolerance (5 or 20 μm in the example in Table 1), the sensor controller 9 outputs an upper limit signal to the numerical controller 6. Similarly, if the measured distance to the outer cylindrical surface 4 of the tool holder 3 is smaller than the negative tolerance (−5 or −20 μm in the example in Table 1), the sensor controller 9 outputs a lower limit signal to the numerical controller 6.

In the "amplitude mode" in Table 1, if the range of variation of the measured distance to the outer cylindrical surface 4 of the tool holder 3 is greater than the tolerance (5 or 20 μm in the example in Table 1), the sensor controller 9 outputs an upper limit signal to the numerical controller 6.

The numerical controller 6 sends movement commands to the spindle motor 5a according to the measurement cycle program 6b, and performs position control of the spindle motor 5a according to the feedback signal obtained from the magnetic sensor 5b mounted on the spindle motor 5a.

When the numerical controller 6 receives an upper or lower limit signal from the sensor controller 9 during a measurement, the numerical controller generates an alarm or performs other appropriate action.

Figure 3:
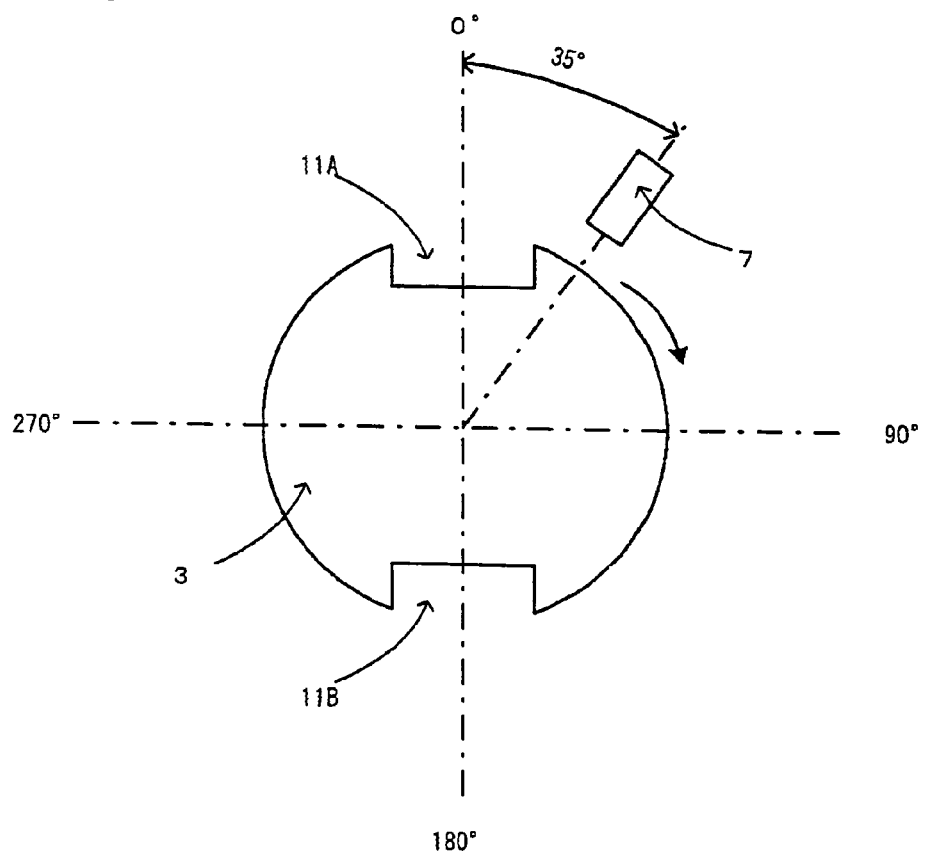
FIG. 3 shows the positional relationship between the sensor head attached to the spindle section of the numerically controlled machine tool in FIG. 1 and the tool holder to be measured.

FIG. 3 shows the positional relationship between the tool holder 3 to be measured and the sensor head 7, as viewed from the axial direction of the spindle. The 0-degree position in FIG. 3 is the reference position of the tool holder and matches, for example, the orientation of the spindle 2b at the completion of a tool exchange. The sensor head 7 is fixed at position 35° indicated in FIG. 3. Reference numerals 11A and 11B in FIG. 3 denote key grooves.

The first example will now be described with reference to FIGS. 4 to 11. In the first example, as described above, only a lower tolerance is set. A measured distance is compared with the lower tolerance, and if the measured distance is smaller than the lower tolerance, rotational run-out of the tool holder is decided as abnormal.

Figure 4A:
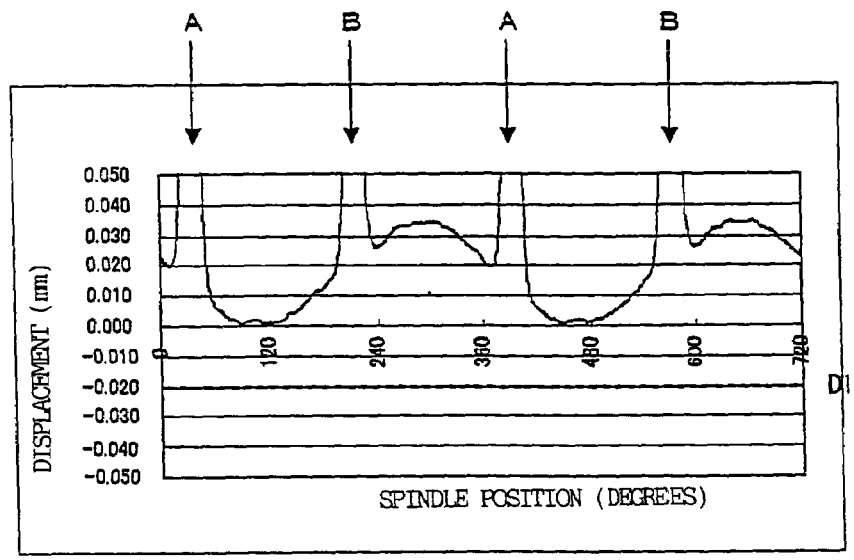
FIGS. 4A and 4B show waveforms of run-out of the outer cylindrical surface of the tool holder that are obtained in the first example when the spindle is rotated.
Figure 4B:
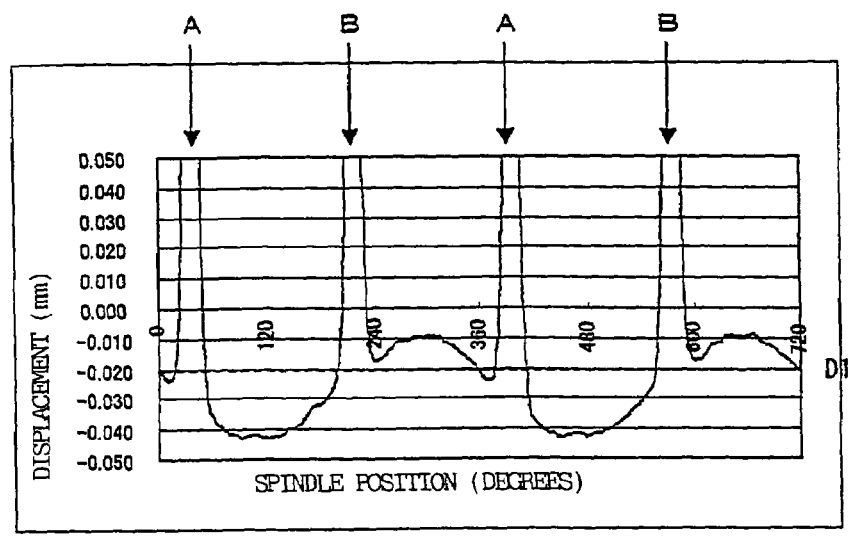

FIGS. 4A and 4B show waveforms formed from exemplary measured distances which are obtained by turning the spindle 2b. These waveforms represent the run-out of the outer cylindrical surface 4 of the tool holder 3. As shown in FIGS. 4A and 4B, each of the waveforms of the measured distances is composed of a combination of two types of waveforms; one is a waveform having a moderate swelling appearing for one cycle per turn of the spindle 2b; the other is a waveform having steep changes at two locations appearing when the key grooves 11 face the sensor head 7 so that detected distance increases. Reference symbols A and B in FIGS. 4A and 4B indicate parts of the waveform corresponding to key grooves 11A and 11B, respectively.

To reduce the effect by the key grooves 11, a predetermined amount of tolerance is provided for negative run-out in the measured waveform, and a tolerance considerably larger than any part of the measured waveform is provided for positive run-out, so that these tolerances are used to check the run-out of the outer cylindrical surface 4 of the tool holder 3.

Run-out in a negative direction will change if a setting criteria of the measurement level (or the threshold level) differs. FIGS. 4A and 4B show exemplary measured waveforms referenced to different reference levels, illustrating waveforms that have the same shape but different measurement levels. If a lower tolerance D1 (−0.020 mm in the figures, for example) is set for these waveforms, the run-out will be decided as normal from the measurement levels in FIG. 4A, while decided as abnormal from the measurement levels in FIG. 4B.

The measurement level can be set by performing a zero setting before start of measurement. Run-out in a negative direction can be increased or decreased by changing the position at which the zero setting is performed. The numerically controlled machine tool according to the present invention performs zero settings at a plurality of different rotational angles in the spindle 2b and repeats executions of measurement following each zero setting, so that the numerically controlled machine tool detects run-out of the tool holder 3 as run-out in a negative direction.

A measurement example will be described below in which zero setting is performed at three rotational angular positions of the spindle 2b.

Figure 5A:
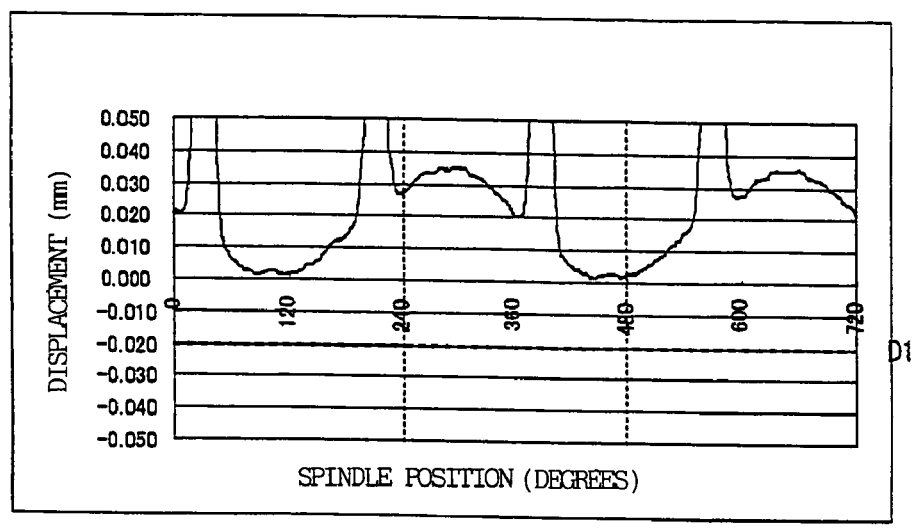
FIGS. 5A and 5B illustrate exemplary waveforms in the first example, in which zero setting is not made in FIG. 5A, and zero settings are made at three angular rotation positions in FIG. 5B.
Figure 5B:
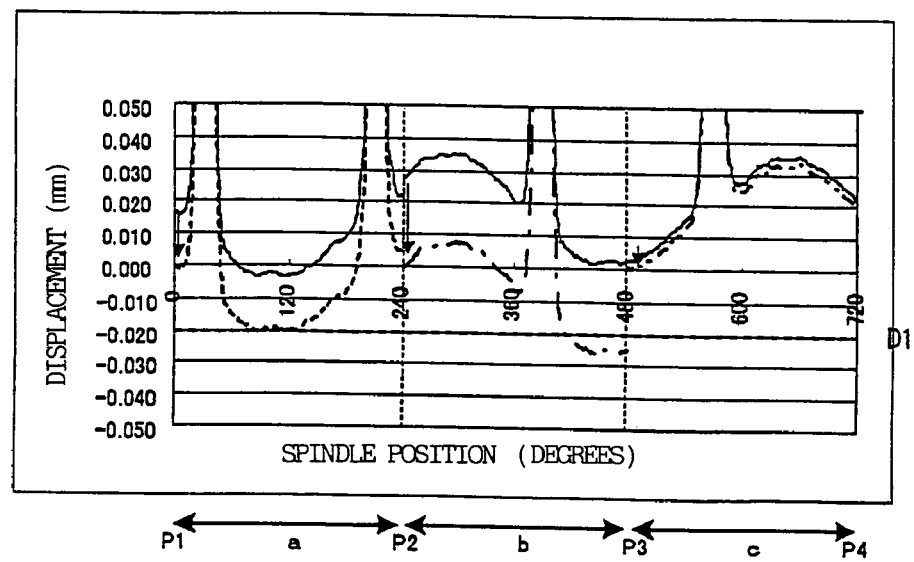

FIG. 5A shows an exemplary waveform obtained without zero setting. FIG. 5B shows an exemplary waveform obtained with zero setting performed at three rotational angular positions. In this example, zero setting is performed at angular positions P1 (at 0° in the figure), P2 (at 240°), and P3 (at 480°). These zero settings divide the waveform into three segments: a waveform (indicated by a dotted line in the figure) in angular range "a" (between P1 and P2), a waveform (indicated by a dashed line) in angular range "b" (between P2 and P3), and a waveform (indicated by a two dot chain line) in angular range "c" (between P3 and P4). If the waveform is thus divided into a plurality of segments and the measurement level at each of these segments is adjusted by means of zero setting, an incomplete detection due to variation of measurement levels can be avoided.

Figure 6:
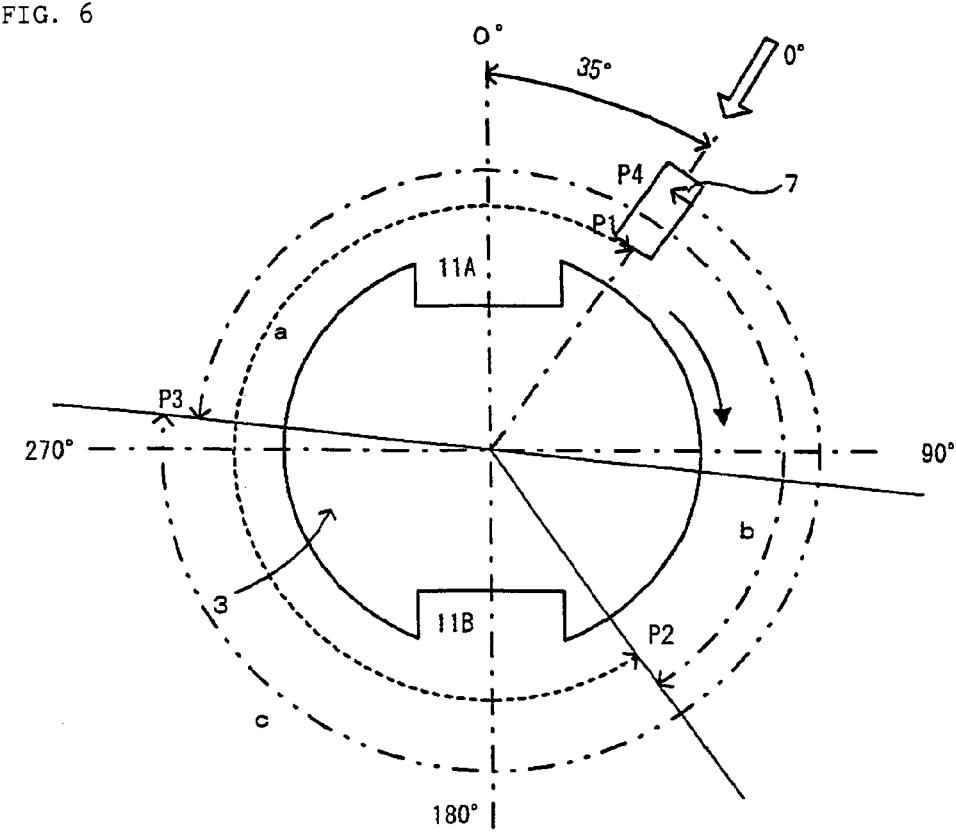
FIG. 6 shows the state of rotational angles of segments "a""b", and "c" in which zero settings are made in the first example.

The zero settings and the measurements in the above segments will be described below. FIG. 6 shows exemplary rotational angles of segments "a", "b", and "c"; in the example, the tool holder 3 is rotated in a normal rotational direction. The rotation is from P1 (0°) to P2 (240°) in segment "a" indicated by the dotted line, from P2 (240°) to P3 (480°) in segment "b" indicated by the dashed line, and from P3 (480°) to P4 (720°) in segment "c" indicated by the two dot chain line.

Figure 7A:
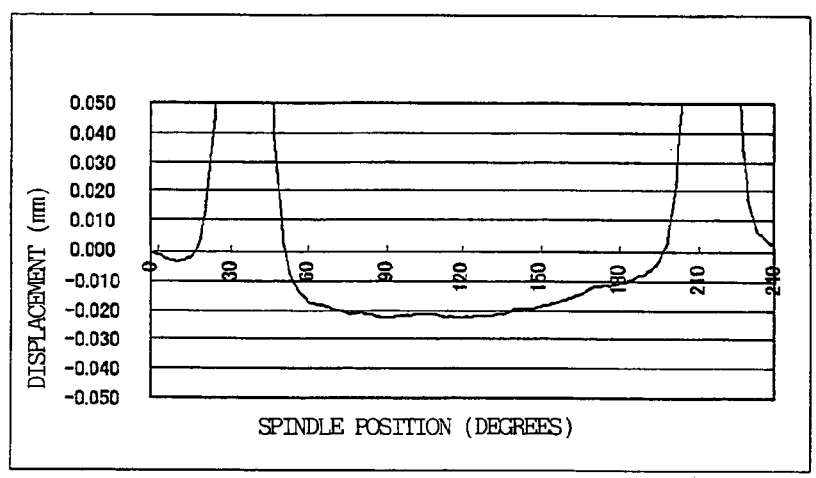
FIG. 7A shows a waveform indicating displacements in segment "a" in FIG. 6.

First, segment "a" will be described with reference to FIGS. 6, 7A, and 7B. FIG. 7A shows the waveform obtained when the numerical controller 6 outputs a zero setting signal at a rotational angle of 0° of the spindle 2b, and the spindle 2b is rotated from 0° to 240°. After the zero setting at a rotational angle of 0°, measurements are performed while the spindle 2b is rotated up to 240°.

The distance (displacement) measured at a rotational angle of 0° is thereby set to 0, and values measured in segment "a" from 0° to 240° are obtained as values relative to 0 at a rotational angle of 0°.

Figure 7B:
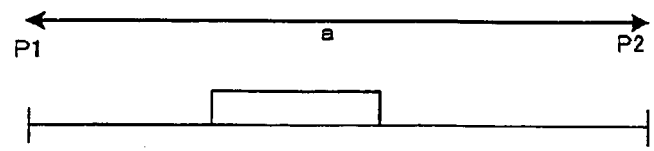
FIG. 7B indicates the portion of the waveform in FIG. 7A detected as abnormal.

If a lower tolerance of, say, −0.020 mm is set, the portion at high level in FIG. 7B is detected abnormal. Segment "a" includes both key grooves 11A and 11B. The values measured at the key grooves deviate greatly in a positive direction. In the first example, +∞ is set as the upper tolerance to prevent the large positive values measured at the key grooves from being decided as abnormal.

Figure 8:
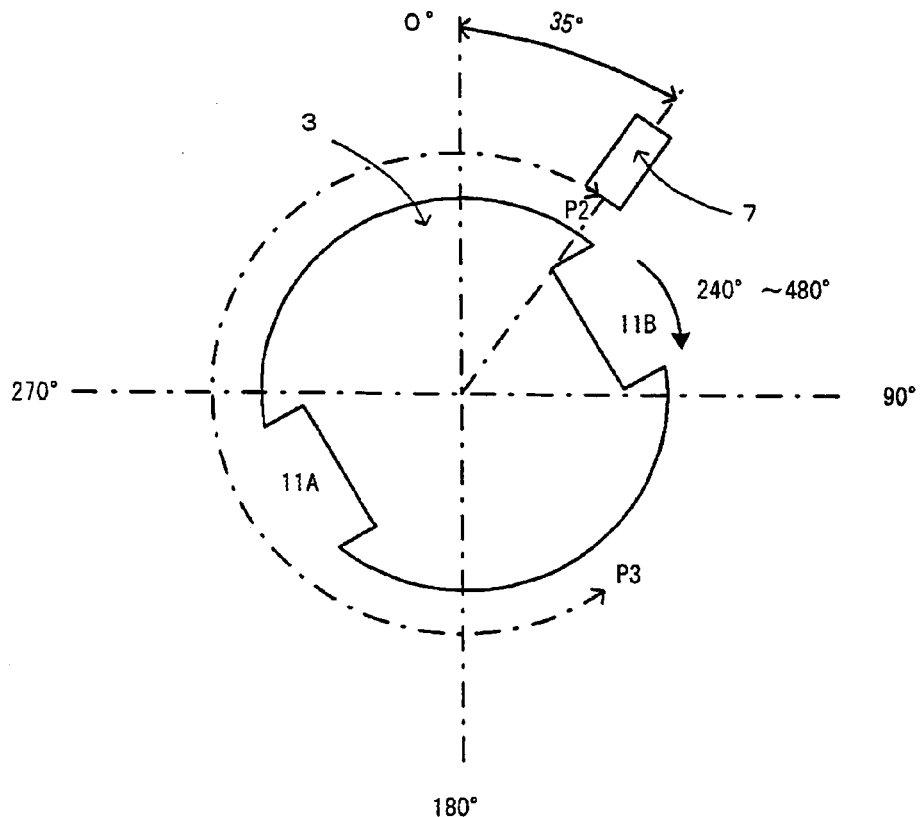
FIG. 8 illustrates the rotation of the tool holder in segment "b" in FIG. 6.

Next, segment "b" will be described with reference to FIGS. 8, 9A, and 9B. In FIG. 8, measurement in segment "b" from P2 to P3 is performed by turning the tool holder 3 from 240° to 480°.

Figure 9A:
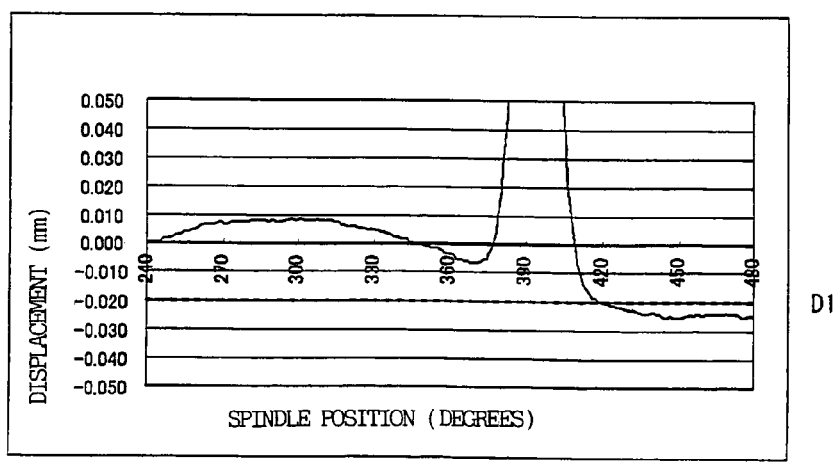
FIG. 9A shows a waveform indicating displacements in segment "b" in FIG. 6.

FIG. 9A shows the waveform obtained when the numerical controller 6 outputs a zero setting signal at a rotational angle of 240° of the spindle 2b, and the spindle 2b is rotated from 240° to 480°. After zero setting at a rotational angle of 240°, measurements are performed while the spindle 2b is rotated up to 480°.

The distance (displacement) measured at a rotational angle of 240° is thereby set to 0, and values measured in segment "b" from 240° to 480° are obtained as values relative to 0 at a rotational angle of 240°.

Figure 9B:
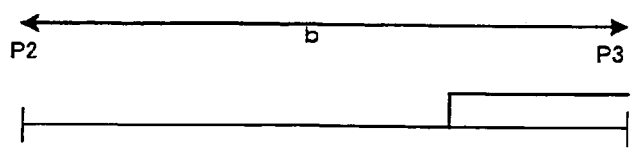
FIG. 9B indicates the portion of the waveform in FIG. 9A detected as abnormal.

If a lower tolerance of, say, −0.020 mm is set, the portion at the high level in FIG. 9B is detected as abnormal. Segment "b" includes key groove 11A. The value measured at this key groove deviates greatly in a positive direction. In segment "b", as in segment "a" described above, +∞ is set as the upper tolerance to prevent the large positive value measured at the key groove from being decided as abnormal.

Figure 10:
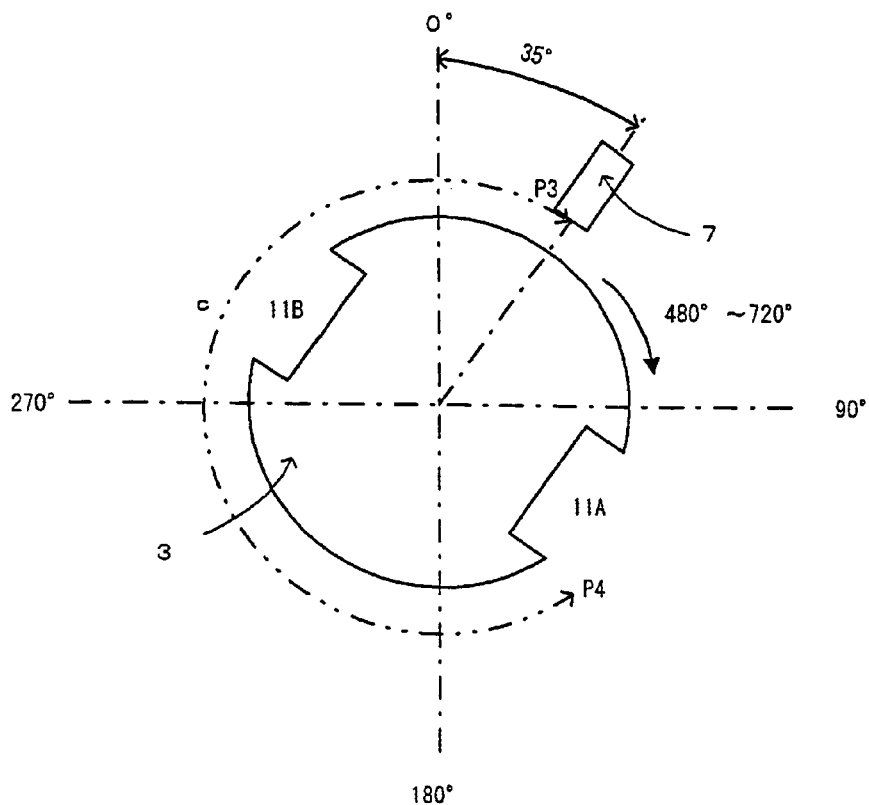
FIG. 10 illustrates the rotation of the tool holder in segment "c" in FIG. 6.

Next, segment "c" will be described with reference to FIGS. 10, 11A, and 11B. In FIG. 10, measurements are made in segment "c" from P3 to P4 by turning the tool holder 3 from 480° to 720°.

Figure 11A:
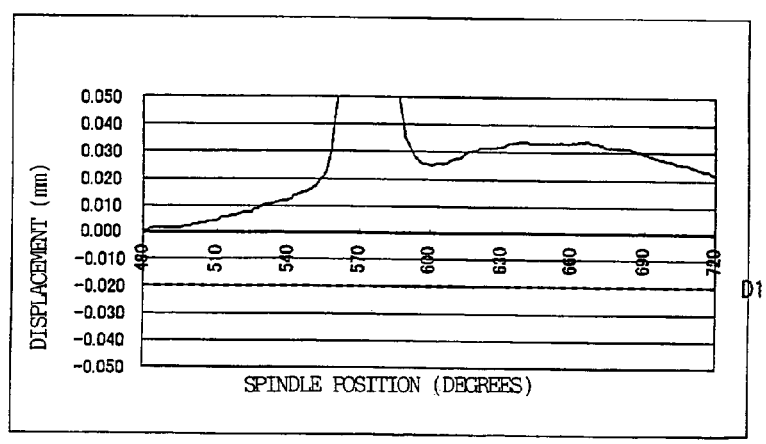
FIG. 11A shows a waveform indicating displacements in segment "c" in FIG. 6.

FIG. 11A shows the waveform obtained when the numerical controller 6 outputs a zero setting signal at a rotational angle of 480° of the spindle 2b, and the spindle 2b is rotated from 480° to 720°. After the zero setting at a rotational angle of 480°, measurements are performed while the spindle 2b is rotated up to 720°.

The distance (displacement) measured at a rotational angle of 480° is thereby set to 0, and values measured in segment "c" from 480° to 720° are obtained as values relative to 0 at a rotational angle of 480°.

Figure 11B:
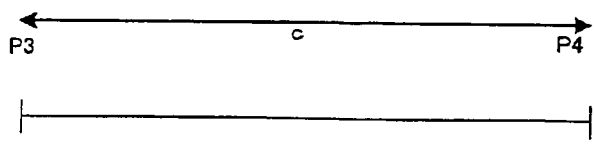
FIG. 11B indicates the portion detected as abnormal in the waveform in FIG. 11A.

If a lower tolerance of, say, −0.020 mm is set, no portion is detected as abnormal, as shown in FIG. 11B (there is no high level signal). Segment "c" includes key groove 11B. The value measured at this key groove deviates greatly in a positive direction. In segment "c", as in segments "a" and "b" described above, +∞ is set as an upper tolerance to prevent the large positive value measured at the key groove from being decided as abnormal.

Therefore, measurement operations in the above segments are performed in the following sequence:

(1) After zero setting at spindle angle of 0°, run-out is measured in the range from 0° to 240° in the normal rotational direction of the spindle.

(2) After zero setting at spindle angle of 240°, run-out is measured in the range from 240° to 480° in the normal rotational direction of the spindle.

(3) After a zero setting at a spindle angle of 480°, run-out is measured in the range from 480° to 720° in the normal rotational direction of the spindle.

The above measurement mode corresponds to "normal mode" selected by tolerance selection signal 1 or 2 in Table 1 above. In this mode, a decision is made as to whether the outer cylindrical surface 4 of the tool holder 3 has deviated in a negative direction beyond the lower tolerance during the measurement operations (1) to (3) above. The lower tolerance in a negative direction is set to −20 µm in FIGS. 7A, 9A, and 11A, but the lower tolerance is not limited to that value and can be set to any value.

The above decision is based on comparison of the values measured during the rotation of the tool holder with the tolerance, so the decision can be made while the tool holder is rotating, enabling quick determination of abnormal run-out, which would not be possible in a method in which an analysis is performed after acquisition of all measured data.

Figure 12:
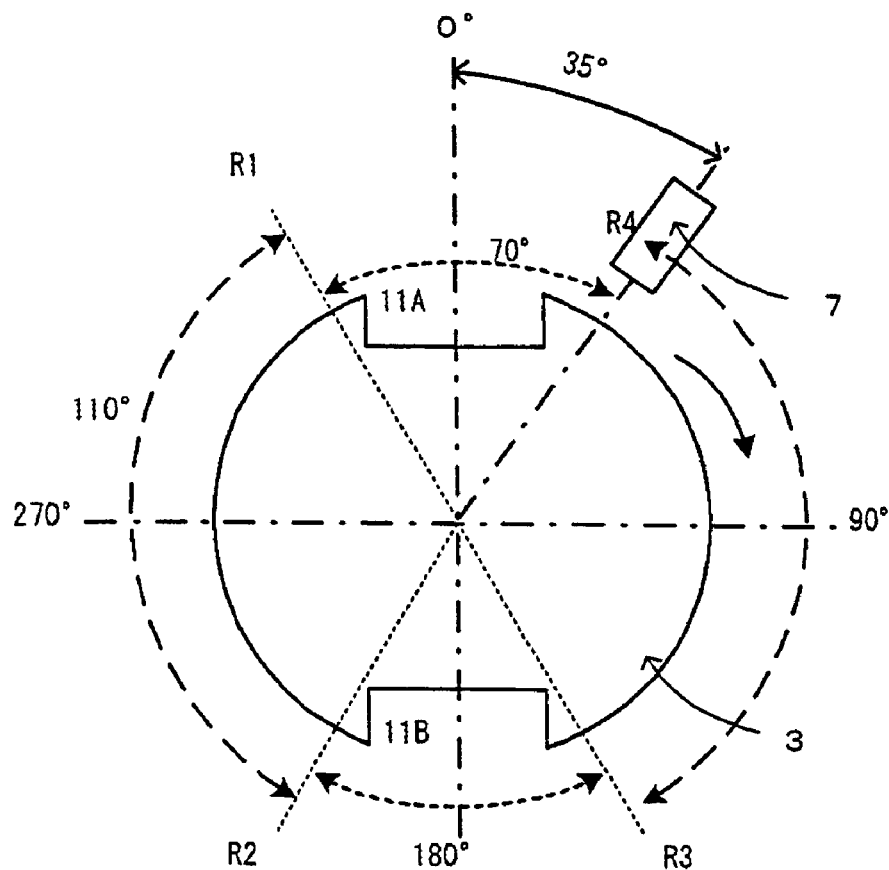
FIG. 12 illustrates the rotation of the tool holder in the second example.

Next, the second example will be described with reference to FIGS. 12 to 14. In the second example, as described above, measured distances are compared with upper and lower limits so that run-out approaching the tool holder, as viewed from the distance sensor, (run-out in a negative direction) and run-out receding from the tool holder, as viewed from the distance sensor, (run-out in a positive direction) are monitored. If a measured distance is outside the range defined by the upper and lower limits, the rotational run-out of the tool holder is decided as abnormal.

In the second example, the measurement mode described above is deemed "normal mode". In this mode, displacements in the positive and negative directions with respect to the outer cylindrical surface 4 of the tool holder 3 are measured (the state of the tolerance selection signals 3 and 4 in Table 1). Large positive run-outs appear at the key grooves 11, so measurements are not performed at the positions of the key grooves 11. FIG. 12 shows the state of rotational angles of the tool holder for the measurement of angular ranges excluding the key grooves. In FIG. 12, the measured range comprises an angular range of 110° from R1 to R2 and an angular range of 110° from R3 to R4, excluding a 70° range at key groove 11A and a 70° range at key groove 11B.

A tolerance having a predetermined value is set for run-out in a negative direction in the measured waveform and a tolerance having a predetermined value is also set for run-out in a positive direction, thereby performing decision on run-out of the outer cylindrical surface of the tool holder.

Figure 13A:
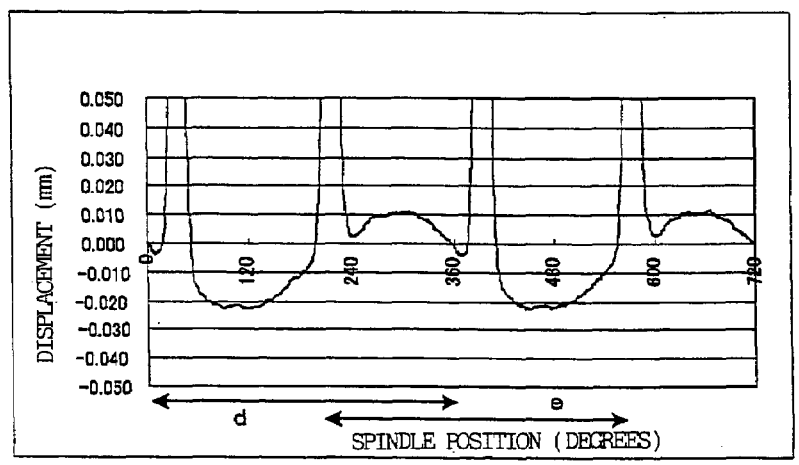
FIGS. 13A to 13C show how zero settings are performed several times at different rotational angles of the spindle.
Figure 13B:
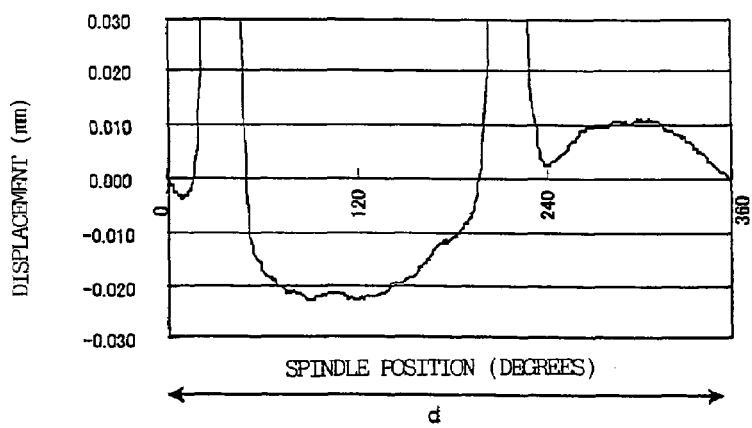
Figure 13C:
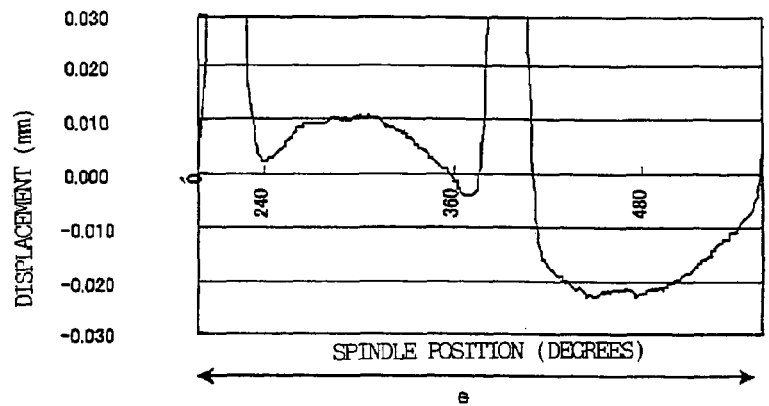

The measurement accuracy can be increased if zero settings are performed at different rotational angles of the spindle and the measurements are performed repeatedly over significant rotational angles of the spindle. FIGS. 13A to 13C illustrate how zero settings are performed at different rotational angles of the spindle. In these figures, measurements are performed in two segments, "d" and "e".

Figure 14A:
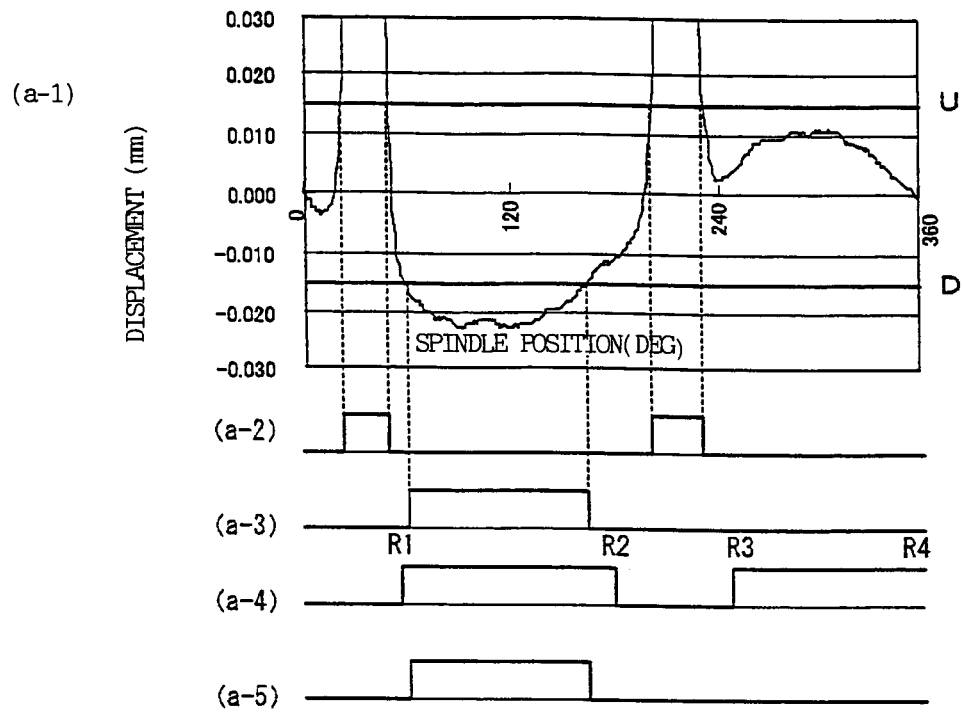
FIGS. 14A and 14B illustrate how rotational run-out of the tool holder is determined as abnormal from upper and lower tolerances in the segments shown in FIGS. 13B and 13C, respectively.
Figure 14B:
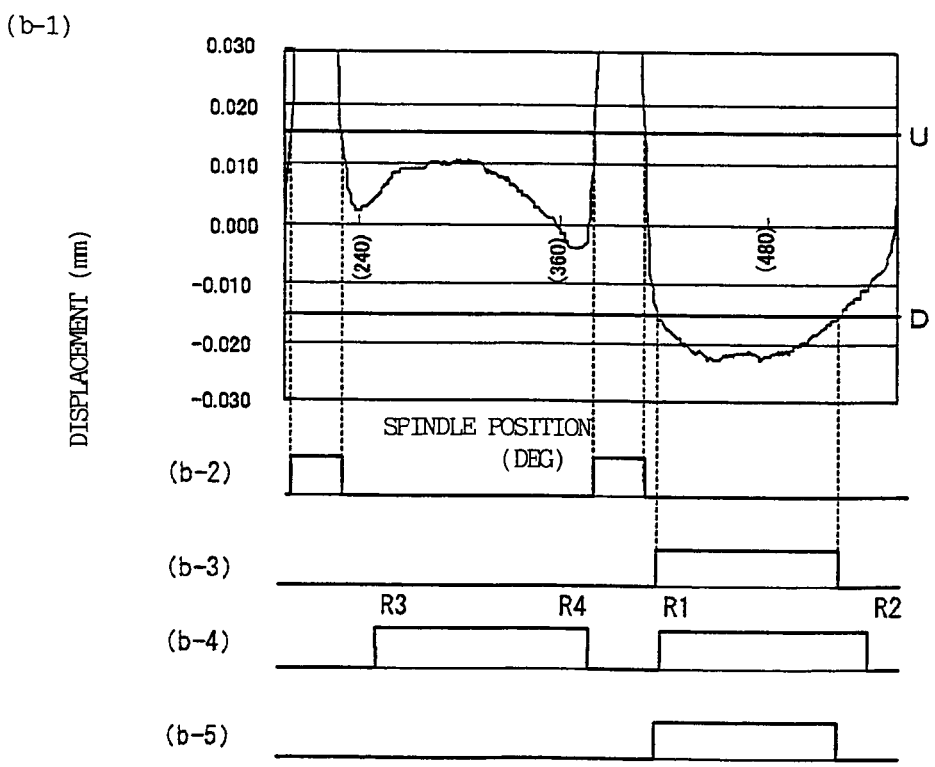

FIGS. 14A and 14B illustrate how rotational run-out of the tool holder is determined as normal or abnormal by using upper and lower tolerances.

FIGS. 14A and 14B show examples in segment "d" in FIG. 13B and segment "e" in FIG. 14C, respectively. An upper tolerance is U (0.015 mm in these figures, indicated by a bold line), while a lower tolerance is D (−0.015 mm in these figures, also indicated by a bold line).

Of the displacements in FIGS. 14A and 14B, the displacements in segment (a-2) in FIG. 14A and segment (b-2) in FIG. 14B exceed the upper tolerance U, and the displacements in segment (a-3) in FIG. 14A and segment (b-3) in FIG. 14B fall below the lower tolerance D. Measurements are performed in segment (a-4) in FIG. 14A and segment (b-4) in FIG. 14B.

If a displacement exceeds the upper tolerance in a positive direction or exceeds the lower tolerance in a negative direction, during measurement, the run-out of the outer cylindrical surface of the tool holder is determined to be out of allowable range. Segment (a-5) in FIG. 14A and segment (b-5) in FIG. 14B show such a result of determination, respectively.

Measurement operations in the above segments are performed in the following sequence:

(1) After zero setting at spindle angle of 0°, run-out is ignored in the range from 0° to 70° in the normal rotational direction of the spindle.

(2) Run-out is measured in the range from 70° to 180° in the normal rotational direction of the spindle.

(3) Run-out is ignored in the range from 180° to 250° in the normal rotational direction of the spindle.

(4) Run-out is measured in the range from 250° to 360° in the normal rotational direction of the spindle.

(5) Whether the upper or lower tolerance has been exceeded during the run-out measurement is determined.

Next, the third example will be described with reference to FIGS. 15 to 18. In the third example, as described above, an allowable amplitude is set as a reference value, and the range of variation in the outer cylindrical surface of the tool holder is monitored. If the range of variation is out of the allowable amplitude, the rotational run-out of the tool holder is decided as abnormal.

In this third example, for ignoring or avoiding the effect by the key groves 11, the rotation of the spindle that rotationally drives the tool holder is controlled so that measured data is obtained only from the angular ranges within which significant measured data for the detection of rotational run-out is obtained, excluding the known angular ranges corresponding to the key grooves. The obtained measured data is thereby free of the effect of the key grooves, enabling accurate measurement of the run-out of the outer cylindrical surface of the tool holder.

The angular ranges corresponding to the key grooves and the remaining angular ranges, from which measured data significant for detection of rotational run-out is obtained, excluding the angular ranges corresponding to the key grooves, can be known from the positions of the key grooves on the tool holder, the position at which the tool holder is mounted on the spindle, and other data. The numerical controller 6 drives the spindle motor according to this angular information to turn the tool holder within the rotational angular range within which measurement is to be performed, and performs measurement within this angular range.

Figure 15:
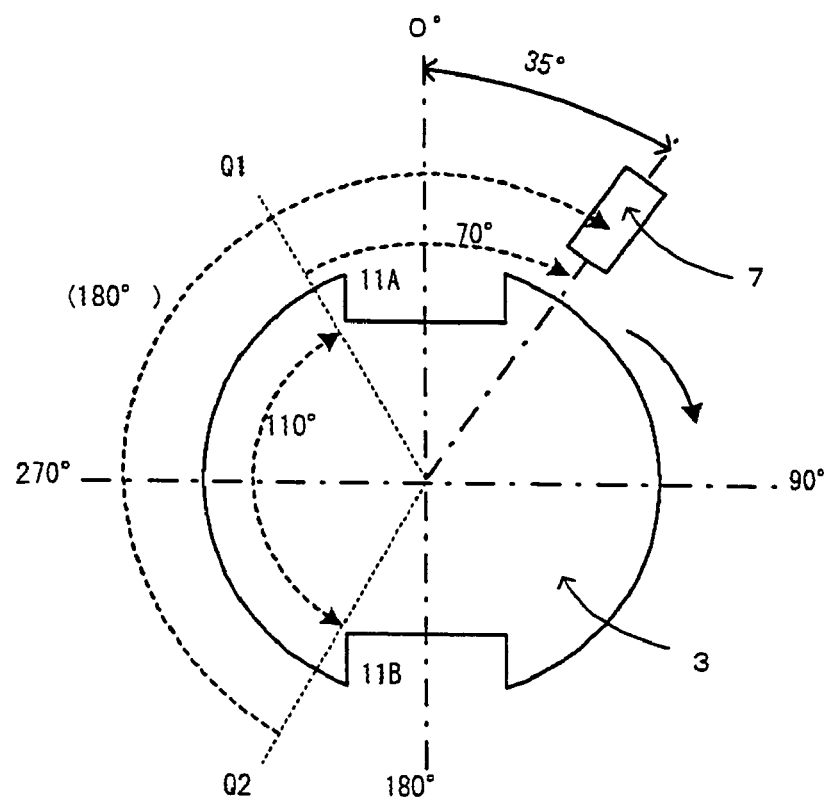
FIG. 15 illustrates the rotation of the tool holder in the third example.

The rotational state of the tool holder in the third example will be described with reference to FIGS. 15, 16A, and 16B. If key grooves 11A and 11B, each having an angular range of 70°, are formed at diametrically opposite positions with respect to the center of the tool holder 3, for example, as shown in FIG. 15, measurement may be confined to rotational positions outside the key grooves 11A and 11B. In FIG. 15, the measurement range is from Q1 at angle of 70° to Q2 at angle of 180°; measurements are not performed within the range from 0° to 70°. The numerical controller controls the spindle motor so that the spindle turns within the range of 70° to 180° during the measurement.

Figure 16A:
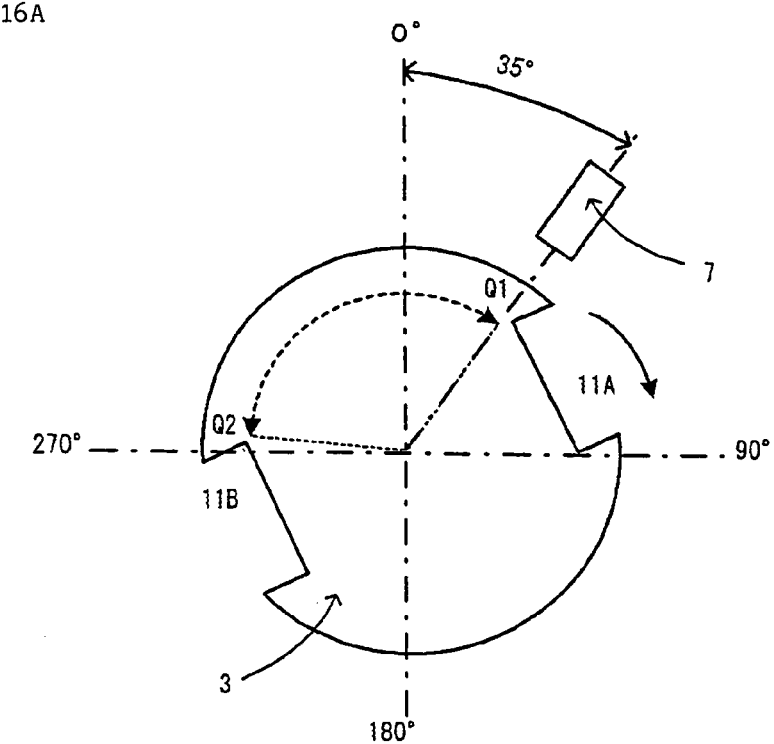
FIG. 16A shows the tool holder positioned at location Q1 in FIG. 15; the tool holder is rotated in a normal rotational direction from Q1 to Q2.
Figure 16B:
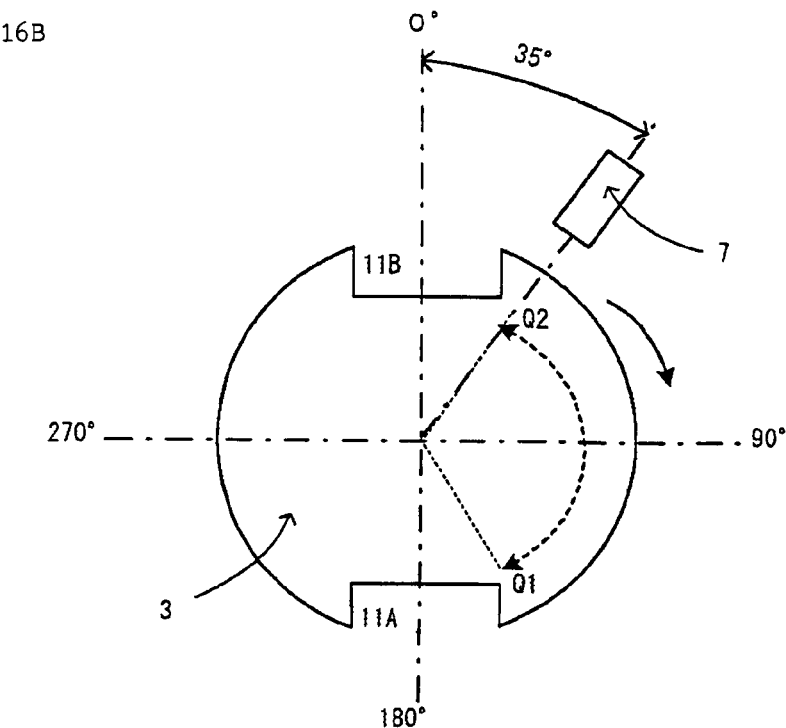
FIG. 16B shows the tool holder rotated to location Q2; measurement is performed in the angular range from Q2 to Q1.

In FIG. 16A, the tool holder is positioned at Q1. This tool holder is rotated from Q1 to Q2 in the normal rotational direction. In FIG. 16B, the tool holder has been rotated up to Q2. Measurements are performed from the angle at Q1 to the angle at Q2.

Figure 17:
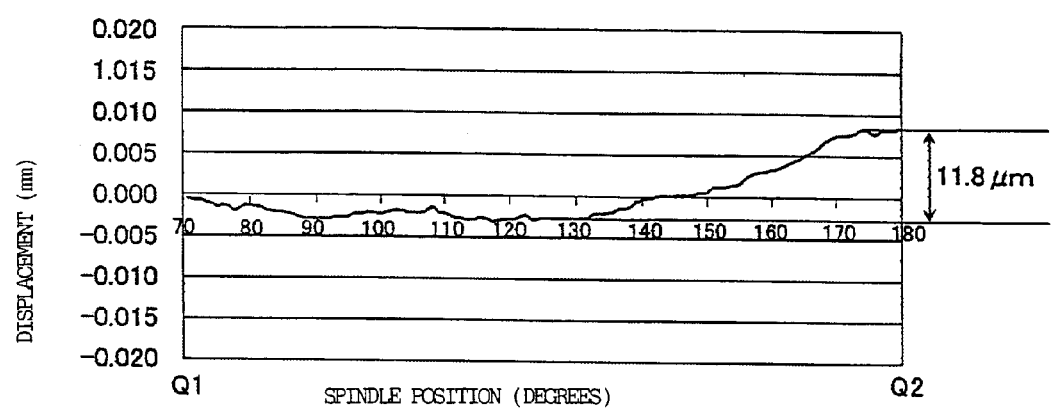
FIG. 17 shows a waveform indicating displacements in the angular range from Q2 to Q1 in FIG. 15.

FIG. 17 shows exemplary data measured within the above angular range, indicating that the maximum difference in the displacements within the angular range from Q1 (70°) to Q2 (180°) is 11.8 μm.

In the example in FIG. 17, the difference between the maximum and minimum values is 11.8 μm, so if the tolerance is set to less than 11.8 μm, the run-out of the outer cylindrical surface 4 of the tool holder 3 exceeds the tolerance, and the run-out is decided as abnormal.

As in the first example, measurement accuracy can be improved if zero settings are performed at different rotational angles of the spindle and measurements are repeated over significant rotational angles of the spindle.

In the third example, the measurement mode described above is "amplitude mode" specified by tolerance selection signals 5 and 6 in Table 1. In the run-out measurement for the outer cylindrical surface 4 of the tool holder 3 in the amplitude mode, a decision is made on the basis of the difference between the maximum and minimum measured values.

In the measurement operation, zero setting is performed at a rotational angle of 70° of the spindle 2b and run-out is measured from 70° to 180° in the normal rotational direction of the spindle.

The above angular range is a continuous angular range, excluding the key grooves 11, on the outer cylindrical surface 4 of the tool holder 3. If any one of key grooves 11 is represented as a positive run-out within ±35° from the center of the groove 11, the angular range for measurement is 110° on the outer cylindrical surface 4 of the tool holder 3.

Figure 18A:
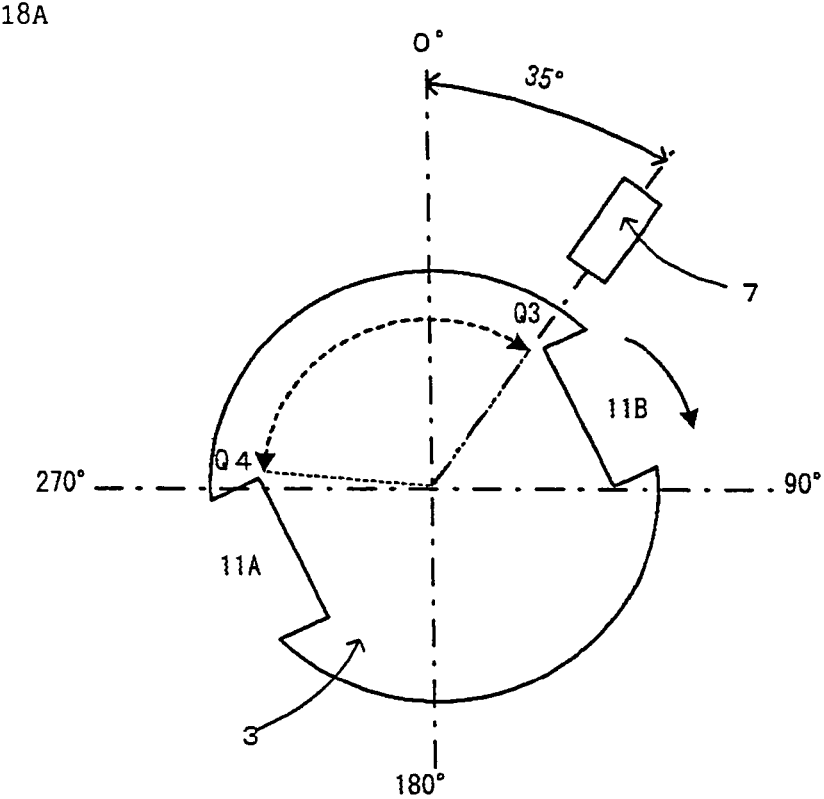
FIGS. 18A and 18B show an example in which measurements are performed in the angular range from Q3 to Q4 diametrically opposite to the range from Q1 to Q2 in FIG. 15.
Figure 18B:
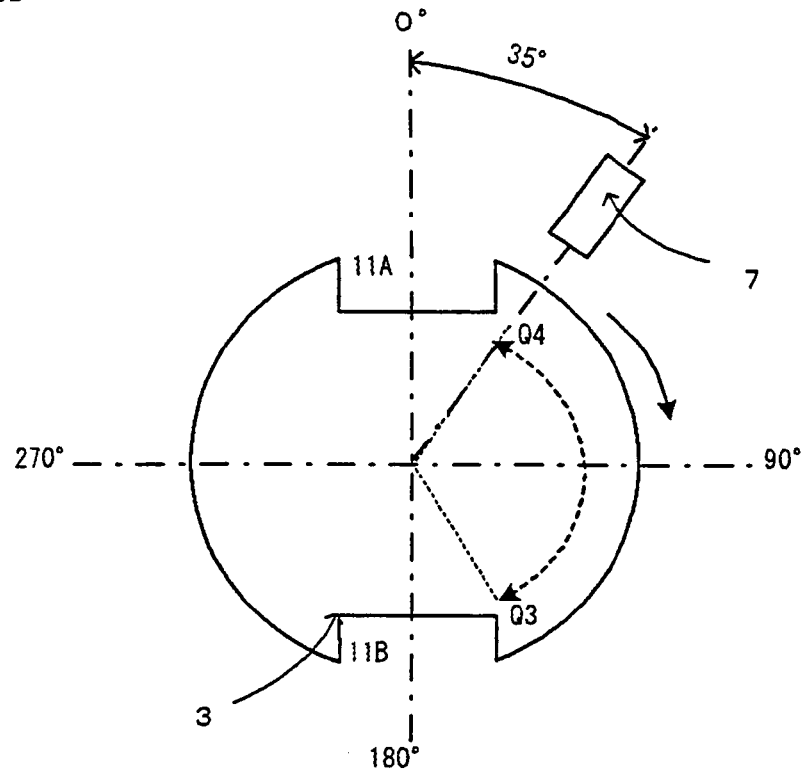

The same measurement is also applied at positions shifted by 180° from the above angles. FIGS. 18A and 18B illustrate this measurement, made in an angular range from Q3 to Q4, diametrically opposite to the above angular range from Q1 to Q2. The tool holder is first positioned at Q3 as shown in FIG. 18A, then rotated from Q3 to Q4 in the normal rotational direction. In FIG. 18B, the tool holder has been rotated to Q4. Measurements are performed from angle Q3 to angle Q4.

For simplicity, the graphs used in the above description intentionally show examples in which the outer cylindrical surface 4 of the tool holder 3 causes large run-outs.

The invention claimed is:

1. A numerically controlled machine tool having a spindle on which a tool holder having an outer surface having key grooves is mounted, whereby a rotational tool is attached to the tool holder and machining is performed by rotating the rotational tool, the numerically controlled machine tool comprising:

predetermined-amount rotating means for stopping the tool holder at a predetermined rotational position and then rotating the tool holder by a given amount; and a distance sensor which is installed apart from the tool holder and measures a distance to the outer surface of the tool holder;

wherein a numerical controller of the numerically controlled machine tool is configured to stop the tool holder by said predetermined-amount rotating means at a rotational position at which the key grooves do not face the distance sensor and to rotate the tool holder by the given amount, and to measure the distance to the tool holder by the distance sensor while the tool holder is being rotated by the given amount, and the measured distances are compared with a reference value to determine whether the rotational run-out of the tool holder is normal or abnormal such that measurements of the distance to the tool holder at the key grooves do not affect the determination.

2. The numerically controlled machine tool according to claim 1, wherein the predetermined-amount rotating means includes a spindle motor and an angular position detecting sensor for detecting an angular position of the spindle motor.

3. The numerically controlled machine tool according to claim 1, wherein the rotational run-out of the tool holder is decided as abnormal if the measured distance is less than the reference value.

4. The numerically controlled machine tool according to claim 1, wherein an upper tolerance and a lower tolerance are set as reference values, and if the measured distance is out of the range defined by the upper tolerance and the lower tolerance, the rotational run-out of the tool holder is decided as abnormal.

5. The numerically controlled machine tool according to claim 1, wherein an allowable amplitude is set as a reference value, and if the range of variation of the measured distances is out of the allowable amplitude, the rotational run-out of the tool holder is decided as abnormal.

6. The numerically controlled machine tool according to claim 1, wherein a predetermined rotational stop position serving also as a start position of said distance measurement is changed, so that distance measurements are performed multiple times.

7. The numerically controlled machine tool according to claim 1, wherein said distance measurements are performed at locations outside the key grooves.

8. The numerically controlled machine tool according to claim 1, wherein the measured value of the distance sensor is set to zero at a predetermined rotational stop position serving as a start position of said distance measurement.

* * * * *

UNITED STATES PATENT AND TRADEMARK OFFICE
CERTIFICATE OF CORRECTION

PATENT NO. : 7,331,741 B2 Page 1 of 1
APPLICATION NO. : 11/114191
DATED : February 19, 2008
INVENTOR(S) : Masahiro Murota et al.

It is certified that error appears in the above-identified patent and that said Letters Patent is hereby corrected as shown below:

In the Drawings

Sheet 13 of 14 (Left-hand side) (FIG. 17), Line 2, change "1.015" to --0.015--.

Column 3, Line 61, change ""a""b"," to --"a","b",--.

Column 5, Line 26, after "FIG. 2A)" insert --.--.

Column 7, Line 1, change "shown" to --(shown--.

Signed and Sealed this

Twenty-eighth Day of October, 2008

JON W. DUDAS
*Director of the United States Patent and Trademark Office*